(12) United States Patent
Bessant et al.

(10) Patent No.: US 11,980,905 B2
(45) Date of Patent: May 14, 2024

(54) AEROSOL-GENERATING DEVICE COMPRISING TWO ATOMISER ASSEMBLIES

(71) Applicant: Philip Morris Products S.A., Neuchatel (CH)

(72) Inventors: Michel Bessant, Neuchatel (CH); Jerome Christian Courbat, Neuchatel (CH); Pascal André Daniel Jean Pratte, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 703 days.

(21) Appl. No.: 17/053,991

(22) PCT Filed: May 16, 2019

(86) PCT No.: PCT/EP2019/062732
§ 371 (c)(1),
(2) Date: Nov. 9, 2020

(87) PCT Pub. No.: WO2019/219875
PCT Pub. Date: Nov. 21, 2019

(65) Prior Publication Data
US 2021/0227881 A1    Jul. 29, 2021

(30) Foreign Application Priority Data

May 16, 2018 (EP) ..................... 18172752

(51) Int. Cl.
*B05B 17/00* (2006.01)
*A24B 15/167* (2020.01)
(Continued)

(52) U.S. Cl.
CPC ........ *B05B 17/0638* (2013.01); *A24B 15/167* (2016.11); *A24F 40/05* (2020.01);
(Continued)

(58) Field of Classification Search
CPC ... B05B 17/0638; A24B 15/167; A24F 40/05; A24F 40/30; A24F 40/46; A24F 40/485; A24F 40/10; A24F 40/40; A24F 40/42
See application file for complete search history.

(56) References Cited

U.S. PATENT DOCUMENTS

| 2014/0238423 A1* | 8/2014 | Tucker | ................. A24F 40/44 131/328 |
| 2015/0034103 A1* | 2/2015 | Hon | ....................... A24F 40/44 131/328 |

(Continued)

FOREIGN PATENT DOCUMENTS

| CA | 3 003 056 A1 | 5/2017 |
| CN | 105722598 A | 6/2016 |

(Continued)

OTHER PUBLICATIONS

Decision to Grant and Search Report dated Aug. 9, 2022 in Russian Patent Application No. 2020141290/05(076867) (with English language translation), 22 pages.

(Continued)

*Primary Examiner* — Edwin A. Leon
(74) *Attorney, Agent, or Firm* — Oblon, McClelland, Maier & Neustadt, L.L.P.

(57) ABSTRACT

An aerosol-generating device is provided, including a first atomiser assembly including a first mesh element defining a plurality of first nozzles each having a minimum diameter of equal to or less than 2.5 micrometres; a second atomiser assembly including a second mesh element defining a plurality of second nozzles each having a minimum diameter of between 3 micrometres and 10 micrometres; a first device connector configured to receive a first liquid reservoir and to supply a first liquid from the first liquid reservoir to the first atomiser assembly; and a second device connector config- (Continued)

ured to receive a second liquid reservoir and to supply a second liquid from the second liquid reservoir to the second atomiser assembly.

15 Claims, 3 Drawing Sheets

(51) Int. Cl.
*A24F 40/05* (2020.01)
*A24F 40/10* (2020.01)
*A24F 40/30* (2020.01)
*A24F 40/46* (2020.01)
*A24F 40/485* (2020.01)
*H02J 7/00* (2006.01)
*H02J 7/34* (2006.01)

(52) U.S. Cl.
CPC ............. *A24F 40/30* (2020.01); *A24F 40/46* (2020.01); *A24F 40/485* (2020.01); *A24F 40/10* (2020.01); *H02J 7/0042* (2013.01); *H02J 7/345* (2013.01)

(56) References Cited

U.S. PATENT DOCUMENTS

| | | | |
|---|---|---|---|
| 2015/0245669 A1* | 9/2015 | Cadieux | A24F 40/50 131/329 |
| 2016/0271347 A1* | 9/2016 | Raichman | A61M 11/042 |
| 2016/0338407 A1* | 11/2016 | Kerdemelidis | A24F 40/60 |
| 2017/0119059 A1* | 5/2017 | Zuber | A24F 40/46 |
| 2017/0238608 A1* | 8/2017 | Matsumoto | A61M 11/006 |
| 2017/0251726 A1 | 9/2017 | Nielsen | |
| 2017/0251727 A1 | 9/2017 | Nielsen | |
| 2019/0014819 A1* | 1/2019 | Sur | A24F 40/50 |

FOREIGN PATENT DOCUMENTS

| | | |
|---|---|---|
| EP | 1 129 741 A2 | 9/2001 |
| JP | 2015-513970 A | 5/2015 |
| RU | 2 517 100 C2 | 5/2014 |
| WO | WO 2017/076590 A1 | 5/2017 |
| WO | WO 2017/153592 A1 | 9/2017 |
| WO | WO 2019/219457 A1 | 11/2019 |
| WO | WO 2019/219865 A1 | 11/2019 |
| WO | WO 2019/219873 A1 | 11/2019 |

OTHER PUBLICATIONS

Combined Chinese Office Action and Search Report dated Jan. 21, 2022 in Chinese Patent Application No. 201980027807.5 (with English translation), 15 pages.
Office Action dated Mar. 6, 2023 in the corresponding Japanese Patent Application No. 2020-563506 (with English Translation), 5 pages.
International Search Report and Written Opinion dated Jul. 29, 2019 in PCT/EP2019/062732 filed on May 16, 2019.

\* cited by examiner

AEROSOL-GENERATING DEVICE COMPRISING TWO ATOMISER ASSEMBLIES

The present invention relates to an aerosol-generating device comprising a first atomiser assembly comprising a first mesh element and a second atomiser assembly comprising a second mesh element. The present invention also relates to an aerosol-generating system comprising the aerosol-generating device.

Handheld electrically operated aerosol-generating systems that consist of a power supply section comprising a battery and control electronics, and a cartridge comprising a supply of liquid aerosol-forming substrate held in a storage portion and an electrically operated atomiser assembly are known. In some examples, the atomiser assembly may comprise an electrical heating element for generating an aerosol by heating and vaporising the liquid aerosol-forming substrate.

Some devices comprise an atomiser assembly comprising a mesh element defining one or more nozzles, wherein the device is arranged to supply the liquid aerosol-forming substrate to one side of the mesh element. The mesh element may be vibrated against the supply of liquid aerosol-forming substrate to generate an aerosol by forcing droplets of liquid aerosol-forming substrate through the nozzles. This arrangement may be referred to as an active mesh element.

Alternative arrangements may comprise an actuator arranged to vibrate the supply of liquid aerosol-forming substrate against the mesh element to force droplets of liquid aerosol-forming substrate through the nozzles. This arrangement may be referred to as a passive mesh element.

An atomiser assembly comprising a mesh element will exhibit a minimum droplet size that may be generated by the atomiser assembly for a particular liquid aerosol-forming substrate. The size of the droplets may affect the pulmonary delivery of the aerosolised liquid aerosol-forming substrate. For example, smaller droplet sizes are typically delivered deeper into the pulmonary system.

It would be desirable to provide an aerosol-generating device that facilitates optimised delivery of liquid aerosol-forming substrate to a user.

According to a first aspect of the present invention there is provided an aerosol-generating device comprising a first atomiser assembly comprising a first mesh element, the first mesh element defining a plurality of first nozzles each having a minimum diameter of equal to or less than about 2.5 micrometres. The aerosol-generating device also comprises a second atomiser assembly comprising a second mesh element, the second mesh element defining a plurality of second nozzles each having a minimum diameter of between about 3 micrometres and about 10 micrometres. The aerosol-generating device also comprises a first device connector for receiving a first liquid reservoir and arranged to supply a first liquid from the first liquid reservoir to the first atomiser assembly. The aerosol-generating device also comprises a second device connector for receiving a second liquid reservoir and arranged to supply a second liquid from the second liquid reservoir to the second atomiser assembly.

As used herein, the term "nozzle" refers to an aperture, hole or bore through the mesh element that provides a passage for liquid to move through the mesh element.

The present inventors have recognised that for some components of a liquid aerosol-forming substrate, such as nicotine, it is desirable to generate an aerosol droplet size of less than about 3 micrometres to increase or maximise pulmonary delivery. However, the present inventors have further recognised that for some liquid aerosol-forming substrates comprising other components, such as high concentrations of aerosol formers and flavourants, the high viscosity of the liquid aerosol-forming substrate makes it difficult to generate aerosol droplets of less than about 3 micrometres. For example, when using a high-viscosity liquid aerosol-forming substrate in combination with a mesh element comprising nozzles each having a minimum diameter of less than about 3 micrometres, the pressure required to force the liquid through the nozzles is impractically high.

Aerosol-generating devices according to the present invention comprise a first atomiser assembly comprising a first mesh element having a plurality of first nozzles each having a minimum diameter of equal to or less than about 2.5 micrometres. Aerosol-generating devices according to the present invention also comprise a second atomiser assembly comprising a second mesh element having a plurality of second nozzles each having a minimum diameter of between about 3 micrometres and about 10 micrometres.

Advantageously, the first atomiser assembly facilitates the generation of aerosol droplets having a size of less than about 3 micrometres.

Advantageously, the second atomiser assembly facilitates the generation of aerosol-droplets having a size of greater than about 3 micrometres.

Advantageously, the first atomiser assembly may be used to aerosolise a first liquid aerosol-forming substrate having a relatively low viscosity. Advantageously, the first atomiser assembly may be used to generate aerosol-droplets having a size of less than about 3 micrometres where pulmonary delivery of the first liquid aerosol-forming substrate is desirable. For example, the first atomiser assembly may be used to aerosolise a liquid aerosol-forming substrate comprising nicotine and a relatively high water content.

Advantageously, the second atomiser assembly may be used to simultaneously aerosolise a second liquid aerosol-forming substrate having a relatively high viscosity. For example, the second atomiser assembly may be used to aerosolise a liquid aerosol-forming substrate comprising an aerosol former and a relatively low water content. Advantageously, the larger nozzles of the second mesh element compared to the first mesh element reduces or minimise the pressure required to aerosolise a relatively high viscosity liquid aerosol-forming substrate.

Advantageously, the second atomiser assembly may be used to generate aerosol-droplets having a size of greater than about 3 micrometres where pulmonary delivery of the second liquid aerosol-forming substrate is not necessary and delivery to the buccal cavity is sufficient or desired. For example, the second atomiser assembly may be used to aerosolise a liquid aerosol-forming substrate comprising a flavourant for delivery to the buccal cavity. Typically, liquid aerosol-forming substrates comprising a flavourant exhibit a relatively high viscosity. Therefore, advantageously, the larger nozzles of the second mesh element are particularly suitable for aerosolising liquid aerosol-forming substrates comprising a flavourant.

Preferably, each of the first nozzles has a minimum diameter of about 2 micrometres.

The aerosol-generating device may further comprise at least one electrical heating element arranged to heat at least one of a first liquid supplied by the first device connector from a first liquid reservoir and a second liquid supplied by the second device connector from a second liquid reservoir. Advantageously, heating a liquid may reduce the viscosity of the liquid. Advantageously, reducing the viscosity of the liquid may reduce or minimise the size of liquid droplets formed by forcing the liquid through the nozzles of the mesh element. Advantageously, reducing the viscosity of the liquid may reduce or minimise the pressure required to force the liquid through the nozzles of the mesh element.

The at least one electrical heating element may comprise a first electrical heating element arranged to heat a first liquid supplied by the first device connector from a first liquid reservoir and second electrical heating element arranged to heat a second liquid supplied by the second device connector from a second liquid reservoir.

The first electrical heating element may be positioned on a surface of the first mesh element. The second electrical heating element may be positioned on a surface of the second mesh element.

Each of the first electrical heating element and the second electrical heating element may comprise a microelectromechanical systems heating element.

Each electrical heating element may comprise an adhesion layer. The adhesion layer may facilitate bonding of the electrical heating element to the surface of the corresponding mesh element. The adhesion layer may comprise a metal. The adhesion layer may comprise tantalum.

Each electrical heating element may comprise one or more resistive heating tracks. The one or more resistive heating tracks may comprise a metal. The one or more resistive heating tracks may comprise at least one of platinum, nickel, and polysilicon.

Each electrical heating element may comprise a passivation layer. The passivation layer may comprise at least one of a metal oxide and a metal nitride. The passivation layer may comprise at least one of silicon nitride, silicon dioxide, titanium dioxide, and aluminium oxide.

The first atomiser assembly may comprise a first elastically deformable element, and a first cavity positioned between the first mesh element and the first elastically deformable element. The first atomiser assembly may also comprise a first liquid inlet for providing a supply of a first liquid to be atomized to the first cavity, and a first actuator arranged to oscillate the first elastically deformable element.

The second atomiser assembly may comprise a second elastically deformable element, and a second cavity positioned between the second mesh element and the second elastically deformable element. The second atomiser assembly may also comprise a second liquid inlet for providing a supply of a second liquid to be atomized to the second cavity, and a second actuator arranged to oscillate the second elastically deformable element.

During use, liquid to be atomised by each atomiser assembly is supplied to the cavity through the liquid inlet. The actuator oscillates the elastically deformable element to force at least some of the liquid within the cavity through the at least one channel and the at least one nozzle of the mesh element. The liquid forced through the at least one nozzle of the mesh element forms at least one droplet. The momentum of the liquid forced through the at least one nozzle to form the at least one droplet carries the at least one droplet away from the mesh element. Therefore, during use, each atomiser assembly generates an aerosol comprising liquid droplets ejected through the mesh element.

Each atomiser assembly may comprise one or more walls at least partially defining the cavity between the mesh element and the elastically deformable element. Each atomiser assembly may comprise at least one side wall. The cavity may be bound by the mesh element, the elastically deformable element and the at least one side wall. The liquid inlet may extend through the at least one side wall.

The cavity of each atomiser assembly may be any suitable shape and size. The cavity of each atomiser assembly may be substantially cylindrical.

Preferably, each actuator is arranged to oscillate the elastically deformable element towards and away from the mesh element. Preferably, the elastically deformable element is arranged opposite the mesh element.

Each actuator may comprise any suitable type of actuator. Each actuator may comprise a piezoelectric element.

Each atomiser assembly may comprise a pre-loading element arranged to compress the actuator between the pre-loading element and the elastically deformable element. Each pre-loading element may be adjustable to vary the compression of the actuator between the pre-loading element and the elastically deformable element. Each pre-loading element may be adjustable. Each pre-loading element may comprise a screw. Each pre-loading element may be manually adjustable. Each pre-loading element may be automatically adjustable. Each atomiser assembly may comprise a motor arranged to move the pre-loading element to vary the compression of the actuator between the pre-loading element and the elastically deformable element.

Preferably, the aerosol-generating device comprises a power supply and a controller arranged to control a supply of power from the power supply to each of the first actuator and the second actuator. During use, the controller controls a supply of power from the power supply to each of the first and second actuators to eject droplets of liquid through the first and second mesh elements, as described herein.

In embodiments in which the aerosol-generating device comprises at least one electrical heating element, preferably the controller is arranged to control a supply of power from the power supply to the at least one electrical heating element. Preferably, the aerosol-generating device is arranged to heat the at least one electrical heating element during use to a temperature of between about 20 degrees Celsius and about 100 degrees Celsius. Preferably, the aerosol-generating device is arranged to heat the at least one electrical heating element during use to a temperature of between about 70 degrees Celsius and about 90 degrees Celsius. Preferably, the aerosol-generating device is arranged to heat the at least one electrical heating element during use to a temperature of about 80 degrees Celsius.

The power supply may be a DC voltage source. In preferred embodiments, the power supply is a battery. For example, the power supply may be a nickel-metal hydride battery, a nickel cadmium battery, or a lithium based battery, for example a lithium-cobalt, a lithium-iron-phosphate or a lithium-polymer battery. The power supply may alternatively be another form of charge storage device such as a capacitor. The power supply may require recharging and may have a capacity that allows for the storage of enough energy for use of the aerosol-generating device with a plurality of liquid reservoirs.

Each of the first and second device connectors may comprise at least one of a bayonet connector, a screw connector, a magnetic connector, and an interference fit connector.

Preferably, the aerosol-generating device comprises a housing. Preferably, the first and second atomiser assemblies, the controller and the power supply are arranged within the housing. The first and second device connectors may be arranged within the housing.

The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may define an aerosol chamber arranged to receive liquid droplets ejected from the first and second mesh elements during use of the aerosol-generating device. Preferably, the aerosol-generating device comprises an air inlet in fluid communication with the aerosol chamber. Preferably, the aerosol-generating device comprises an air outlet in fluid communication with the aerosol chamber.

The aerosol-generating device may comprise a mouthpiece in fluid communication with the air outlet. The mouthpiece may be formed integrally with the housing. The mouthpiece may be detachable from the housing.

During use, a user draws on the mouthpiece to draw air into the aerosol chamber through the air inlet. The air flows through the aerosol chamber where liquid droplets ejected from the first and second mesh elements are entrained within the airflow to form an aerosol. The aerosol flows out of the aerosol chamber through the air outlet and is delivered to the user through the mouthpiece.

The aerosol-generating device may comprise a sensor to detect airflow indicative of a user taking a puff. The air flow sensor may be an electro-mechanical device. The air flow sensor may be any of a mechanical device, an optical device, an opto-mechanical device and a micro electro-mechanical systems (MEMS) based sensor. The controller may be arranged to supply power from the power supply to the actuator of each atomiser assembly in response to a signal from the air flow sensor indicative of a user taking a puff.

The aerosol-generating device may comprise a manually operable switch for a user to initiate a puff. The controller may be arranged to supply power from the power supply to the actuator of each atomiser assembly in response to a signal from the manually operable switch.

Preferably, the aerosol-generating device comprises an indicator for indicating when power is being supplied from the power supply to the actuator of each atomiser assembly. The indicator may comprise a light arranged to illuminate when power is being supplied from the power supply to the actuator of each atomiser assembly.

The aerosol-generating device may comprise at least one of an external plug or socket and at least one external electrical contact allowing the aerosol-generating device to be connected to another electrical device. For example, the aerosol-generating device may comprise a USB plug or a USB socket to allow connection of the aerosol-generating device to another USB enabled device. The USB plug or socket may allow connection of the aerosol-generating device to a USB charging device to charge a rechargeable power supply within the aerosol-generating device. The USB plug or socket may support the transfer of data to or from, or both to and from, the aerosol-generating device. The aerosol-generating device may be connectable to a computer to transfer data to the aerosol-generating device.

In those embodiments in which the aerosol-generating device comprises a USB plug or socket, the aerosol-generating device may further comprise a removable cover that covers the USB plug or socket when not in use. In embodiments in which the USB plug or socket is a USB plug, the USB plug may additionally or alternatively be selectively retractable within the device.

According to a second aspect of the present invention there is provided an aerosol-generating system comprising an aerosol-generating device according to the first aspect of the present invention, in accordance with any of the embodiments described herein. The aerosol-generating system also comprises a first liquid reservoir containing a first liquid aerosol-forming substrate, and a second liquid reservoir containing a second liquid aerosol-forming substrate.

During use, the first liquid reservoir is at least partially received by the first device connector to supply the first liquid aerosol-forming substrate to the first liquid inlet of the first atomiser assembly. During use, the second liquid reservoir is at least partially received by the second device connector to supply the second liquid aerosol-forming substrate to the second liquid inlet of the second atomiser assembly.

Preferably, each liquid reservoir comprises a container, wherein the liquid aerosol-forming substrate is positioned within the container. The container may be formed from any suitable material. The container may be formed from at least one of glass, metal, and plastic. The container may be transparent. The container may be translucent.

The container may define an opening through which the liquid aerosol-forming substrate may flow from the container. Preferably, each liquid reservoir comprises a seal overlying the opening to seal the liquid aerosol-forming substrate within the container. Preferably, the seal is at least one of removable and frangible. The aerosol-generating device may comprise a first piercing element arranged to pierce a first seal when the first liquid reservoir is at least partially received by the first device connector. The aerosol-generating device may comprise a second piercing element arranged to pierce a second seal when the second liquid reservoir is at least partially received by the second device connector.

The first liquid reservoir may comprise a first reservoir connector arranged for connection with the first device connector of the aerosol-generating device. The first reservoir connector may comprise at least one of a bayonet connector, a screw connector, a magnetic connector, and an interference fit connector.

The second liquid reservoir may comprise a second reservoir connector arranged for connection with the second device connector of the aerosol-generating device. The second reservoir connector may comprise at least one of a bayonet connector, a screw connector, a magnetic connector, and an interference fit connector.

Preferably, the first liquid aerosol-forming substrate comprises water in an amount of at least about 40 percent by weight of the first liquid aerosol-forming substrate. The first liquid aerosol-forming substrate may further comprises at least one of propylene glycol, glycerin, nicotine, and a flavourant. The first liquid aerosol-forming substrate may comprise nicotine in an amount of between about 0.5 percent and about 10 percent by weight of the first liquid aerosol-forming substrate. The nicotine containing first liquid aerosol-forming substrate comprise a nicotine salt matrix. The first liquid aerosol-forming substrate may comprise plant-based material. The first liquid aerosol-forming substrate may comprise tobacco. The first liquid aerosol-forming substrate may comprise homogenised tobacco material. The first liquid aerosol-forming substrate may comprise a non-tobacco-containing material. The first liquid aerosol-forming substrate may comprise homogenised plant-based material.

The second aerosol-forming substrate may comprise water in an amount of less than about 40 percent by weight of the second aerosol-forming substrate. The second aerosol-forming substrate may comprise water in an amount of less than about 30 percent by weight of the second aerosol-forming substrate. The second aerosol-forming substrate may comprise water in an amount of less than about 20 percent by weight of the second aerosol-forming substrate. The second aerosol-forming substrate may comprise a flavourant and at least one of propylene glycol and glycerin. The second liquid aerosol-forming substrate may comprise glycerin in an amount of at least about 35 percent by weight of the second liquid aerosol-forming substrate.

The invention will be further described, by way of example only, with reference to the accompanying drawings, in which.

Figure 1:
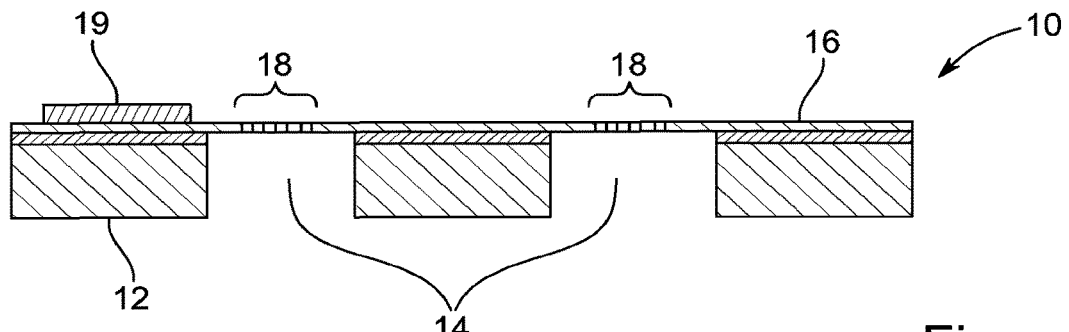
FIG. 1 shows a cross-sectional view of a mesh element for use in an aerosol-generating device according to an embodiment of the present invention.
Figure 2:
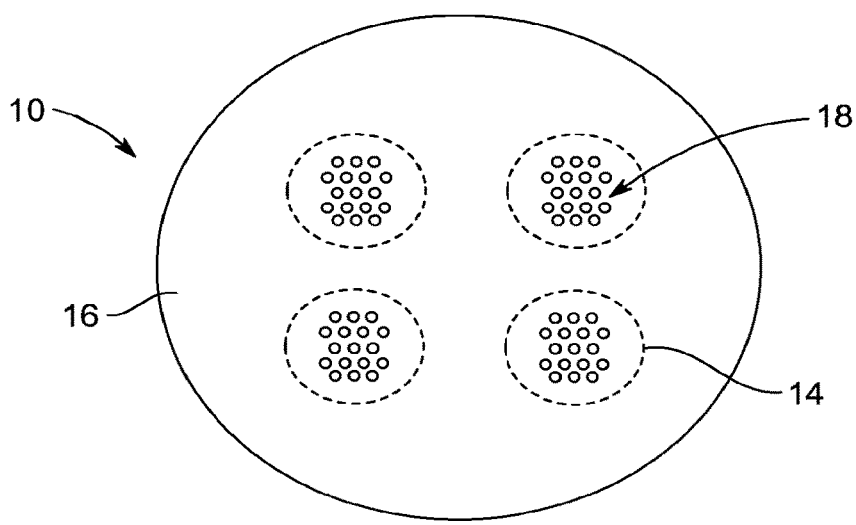
FIG. 2 shows a plan view of the mesh element of FIG. 1.

FIGS. 1 and 2 show a mesh element 10 for use in an aerosol-generating device according to an embodiment of the present invention. The mesh element 10 comprises a first layer 12 defining a plurality of cylindrical channels 14 and a second layer 16 defining a plurality of nozzles 18. The nozzles 18 are arranged into groups, wherein each group of nozzles 18 overlies one of the channels 14.

The mesh element 10 also comprises an electrical heating element 19 positioned on the second layer 16. During use, the electrical heating element 19 heats the mesh element 10, which heats liquid being ejected through the nozzles 18.

Figure 3:
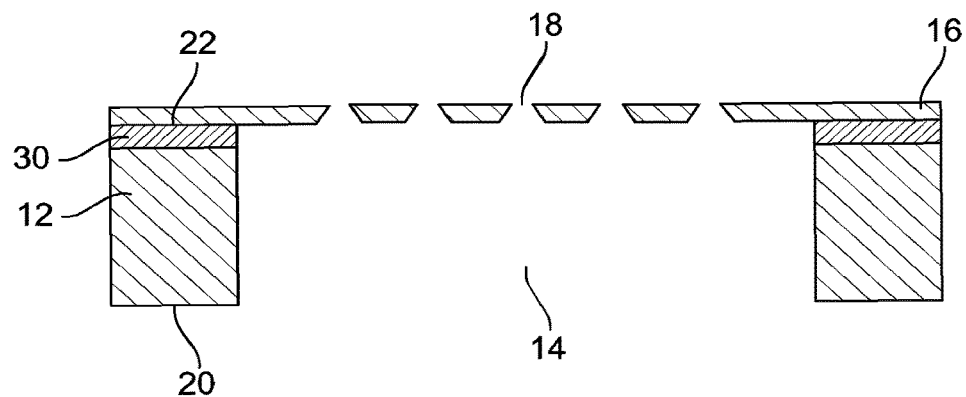
FIG. 3 shows an enlarged cross-sectional view of a portion of the mesh element of FIG. 1.
Figure 4:
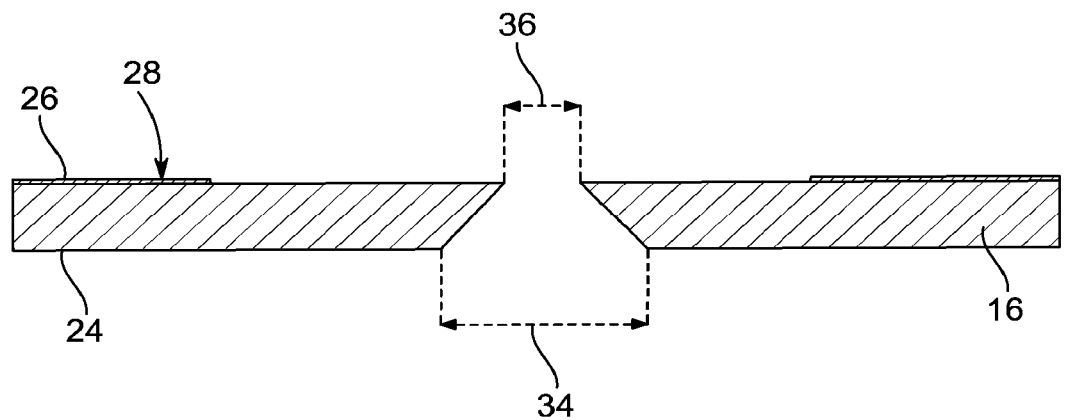
FIG. 4 shows a cross-sectional view of a single nozzle of the mesh element of FIG. 1.

FIGS. 3 and 4 show enlarged cross-sectional views of one of the channels 14 and one of the nozzles 18. The first layer 12 comprises a first surface 20 and a second surface 22. The second layer 16 comprises an inner surface 24 facing the second surface 22 of the first layer 12. The second layer 16 also comprises an outer surface 26 on which a hydrophobic coating 28 is provided. The first and second layers 12, 16 are formed from silicon wafers. A buried oxide layer 30 is formed by oxidation of the second surface 22 of the first layer 12 before the first and second layers 12, 16 are bonded together during the manufacture of the mesh element 10.

Each nozzle 18 has a triangular cross-sectional shape such that each nozzle 18 has a maximum diameter 34 at the inner surface 24 of the second layer 16 and a minimum diameter 36 at the outer surface 26 of the second layer 16. The minimum diameter 36 of each nozzle 18 is selected according to the desired size of liquid droplets to be ejected through the nozzle 18 during use.

Figure 5:
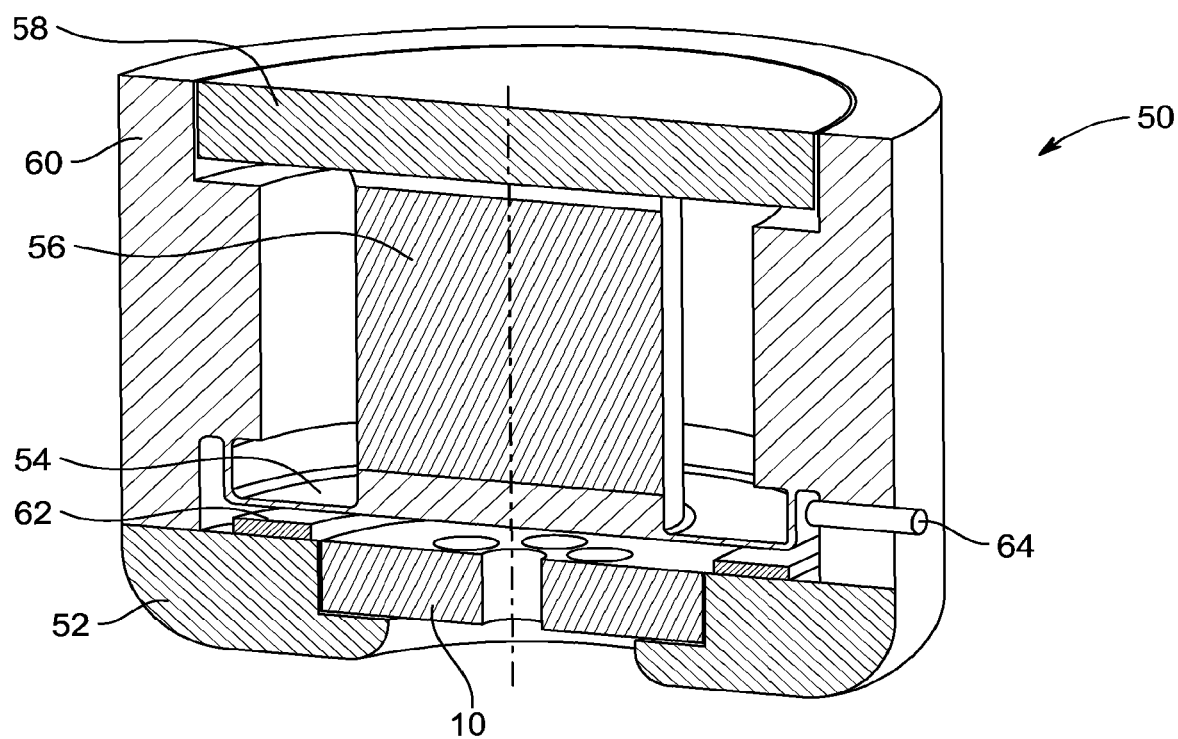
FIG. 5 shows a perspective cross-sectional view of an atomiser assembly comprising the mesh element of FIG. 1.

FIG. 5 shows a perspective cross-sectional view of an atomiser assembly 50 comprising the mesh element 10 of FIG. 1. The mesh element 10 is received within a mesh element housing 52. The atomiser assembly 50 also comprises an elastically deformable element 54 and an actuator 56 arranged to oscillate the elastically deformable element 54. The actuator 56 is a piezoelectric actuator.

The atomiser assembly 50 also comprises a pre-loading element 58 arranged to compress the actuator 56 between the pre-loading element 58 and the elastically deformable element 54. The pre-loading element 58, the actuator 56 and the elastically deformable element 54 are arranged within an actuator housing 60. The actuator housing 60 is attached to the mesh element housing 52 to define a cavity 62 between the mesh element 10 and the elastically deformable element 54. The actuator housing 60 defines a liquid inlet 64 for providing a supply of liquid to be atomised to the cavity 62.

During use, liquid to be atomised is supplied to the cavity 62 through the liquid inlet 64. The actuator 56 oscillates the elastically deformable element 54 to force at least some of the liquid within the cavity 62 through the channels 14 and the nozzles 18 of the mesh element 10. The liquid forced through the nozzles 18 of the mesh element 10 form droplets. The momentum of the liquid forced through the nozzles 18 to form the droplets carries the droplets away from the mesh element 10. Therefore, during use, the atomiser assembly 50 generates an aerosol comprising liquid droplets ejected through the mesh element 10.

Figure 6:
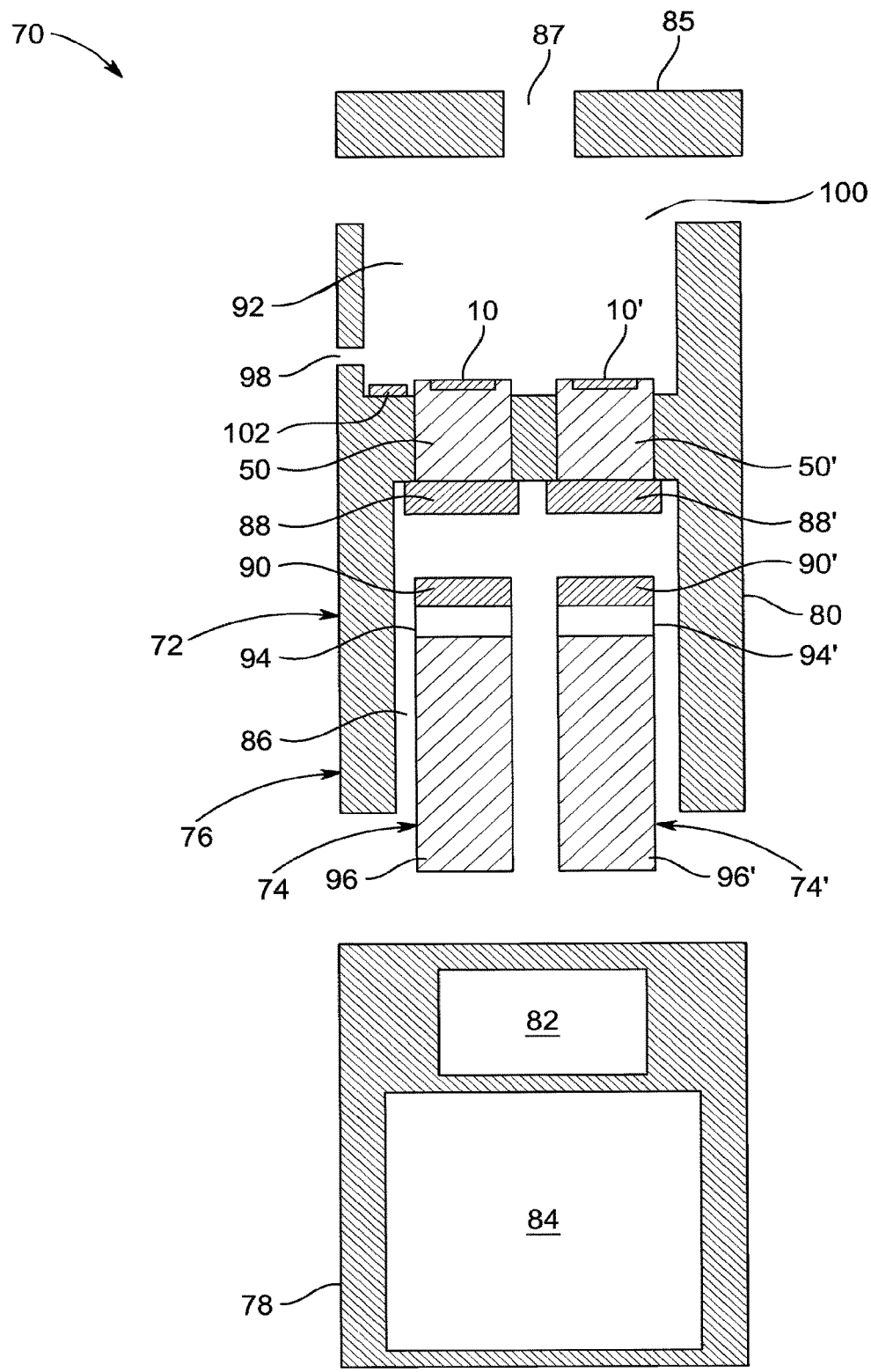
FIG. 6 shows a partially exploded cross-sectional view of an aerosol-generating system according to an embodiment of the present invention.

FIG. 6 shows a cross-sectional view of an aerosol-generating system 70 according to an embodiment of the present invention. The aerosol-generating system 70 comprises an aerosol-generating device 72, a first liquid reservoir 74 and a second liquid reservoir 74'.

The aerosol-generating device 72 comprises a housing 76 comprising a first housing portion 78 and a second housing portion 80. A controller 82 and a power supply 84 comprising a battery are positioned within the first housing portion 78. A mouthpiece 85 defining a mouthpiece channel 87 is connectable to the second housing portion 80.

The second housing portion 80 defines a liquid reservoir chamber 86 for receiving the first liquid reservoir 74 and the second liquid reservoir 74'. The first housing portion 78 is detachable from the second housing portion 80 to allow replacement of the first and second liquid reservoirs 74, 74'.

The aerosol-generating device 72 comprises a first device connector 88 positioned within the liquid reservoir chamber 86 for engagement with a first reservoir connector 90 that forms part of the first liquid reservoir 74. The aerosol-generating device 72 also comprises a second device connector 88' positioned within the liquid reservoir chamber 86 for engagement with a second reservoir connector 90' that forms part of the second liquid reservoir 74'.

The aerosol-generating device 72 comprises a first atomiser assembly 50 and a second atomiser assembly 50' each positioned within the second housing portion 80. Each of the first and second atomiser assemblies 50, 50' has the same features as the atomiser assembly 50 of FIG. 5. The nozzles 18 of the mesh element 10 of the first atomiser assembly 50 each have a minimum diameter of equal to or less than about 2.5 micrometres. The nozzles of the mesh element 10' of the second atomiser assembly 50' each have a minimum diameter of between about 3 micrometres and about 10 micrometres.

The liquid inlet 64 of the first atomiser assembly 50 is in fluid communication with the first device connector 88. The liquid inlet of the second atomiser assembly 50' is in fluid communication with the second device connector 88'. The mesh elements 10, 10' of the first and second atomiser assemblies 50, 50' are positioned within an aerosol chamber 92 defined by the second housing portion 80.

The first liquid reservoir 74 comprises a first container 94 and a first liquid aerosol-forming substrate 96 positioned within the first container 94. The first liquid aerosol-forming substrate 96 comprises 1.7 weight percent nicotine, 1.25 weight percent flavourant, 20 weight percent glycerin, 37.9 weight percent propylene glycol, and 39.15 weight percent water. When the first reservoir connector 90 is engaged with the first device connector 88, first liquid aerosol-forming substrate 96 from the first liquid reservoir 74 is supplied to the cavity 62 of the first atomiser assembly 50 through the first reservoir connector 90, the first device connector 88, and the liquid inlet 64 of the first atomiser assembly 50.

The second liquid reservoir 74' comprises a second container 94' and a second liquid aerosol-forming substrate 96' positioned within the second container 94'. The second liquid aerosol-forming substrate 96' comprises 40 weight percent glycerin, 40 weight percent propylene glycol, and 20 weight percent water. When the second reservoir connector 90' is engaged with the second device connector 88', second liquid aerosol-forming substrate 96' from the second liquid reservoir 74' is supplied to the cavity of the second atomiser assembly 50' through the second reservoir connector 90', the second device connector 88', and the liquid inlet of the second atomiser assembly 50'.

When the first housing portion 78 is connected to the second housing portion 80, the controller 82 controls a supply of power from the power supply 84 to the actuators 56 of the first and second atomiser assemblies 50, 50' to eject droplets of the first and second liquid aerosol-forming substrates 96, 96' into the aerosol chamber 92 from the mesh elements 10, 10'.

The second housing portion 80 defines an air inlet 98 and an air outlet 100 each in fluid communication with the aerosol chamber 92. During use, a user draws on the mouthpiece 85 to draw air into the aerosol chamber 92 through the air inlet 98. The air flows through the aerosol chamber 92 where droplets of the first and second liquid aerosol-forming substrates 96, 96' ejected from the mesh elements 10, 10' are entrained within the airflow to form an aerosol. The aerosol flows out of the aerosol chamber 92 through the air outlet 100 and is delivered to the user through the mouthpiece channel 87.

The aerosol-generating device 72 also comprises an airflow sensor 102 positioned within the aerosol chamber 92. The airflow sensor 102 is arranged to provide a signal to the controller 82 indicative of a user drawing on the mouthpiece 85. The controller 82 is arranged to supply power from the power supply 84 to the actuators 56 of the first and second atomiser assemblies 50, 50' only when the controller receives a signal from the airflow sensor 102 indicative of a user drawing on the mouthpiece 85.

The invention claimed is:

1. An aerosol-generating device, comprising:
   a first atomiser assembly comprising a first mesh element, the first mesh element defining a plurality of first nozzles each having a minimum diameter of equal to or less than 2.5 micrometres;
   a second atomiser assembly comprising a second mesh element, the second mesh element defining a plurality of second nozzles each having a minimum diameter of between 3 micrometres and 10 micrometres;
   a first device connector configured to receive a first liquid reservoir and to supply a first liquid from the first liquid reservoir to the first atomiser assembly; and
   a second device connector configured to receive a second liquid reservoir and to supply a second liquid from the second liquid reservoir to the second atomiser assembly.

2. The aerosol-generating device according to claim 1, wherein each of the first nozzles has a minimum diameter of 2 micrometres.

3. The aerosol-generating device according to claim 1, further comprising at least one electrical heating element configured to heat at least one of the first liquid supplied by the first device connector from the first liquid reservoir and the second liquid supplied by the second device connector from the second liquid reservoir.

4. The aerosol-generating device according to claim 3, further comprising a power supply and a controller configured to control a supply of power from the power supply to the at least one electrical heating element to heat the at least one electrical heating element to a temperature of between 70 degrees Celsius and 90 degrees Celsius.

5. The aerosol-generating device according to claim 3, wherein the at least one electrical heating element comprises a first electrical heating element configured to heat the first liquid supplied by the first device connector from the first liquid reservoir and second electrical heating element configured to heat the second liquid supplied by the second device connector from the second liquid reservoir.

6. The aerosol-generating device according to claim 5, wherein the first electrical heating element is disposed on a surface of the first mesh element, and wherein the second electrical heating element is disposed on a surface of the second mesh element.

7. The aerosol-generating device according to claim 6, wherein each of the first electrical heating element and the second electrical heating element comprises a microelectromechanical systems heating element.

8. The aerosol-generating device according to claim 1, wherein the first atomiser assembly comprises:
   a first elastically deformable element,
   a first cavity disposed between the first mesh element and the first elastically deformable element,
   a first liquid inlet configured to provide a supply of the first liquid to be atomized to the first cavity, and
   a first actuator configured to oscillate the first elastically deformable element; and
   wherein the second atomiser assembly comprises:
   a second elastically deformable element,
   a second cavity disposed between the second mesh element and the second elastically deformable element,
   a second liquid inlet configured to provide a supply of the second liquid to be atomized to the second cavity, and
   a second actuator configured to oscillate the second elastically deformable element.

9. The aerosol-generating device according to claim 8, wherein each of the first actuator and the second actuator comprises a piezoelectric element.

10. The aerosol-generating device according to claim 8, further comprising a power supply and a controller configured to control a supply of power from the power supply to each of the first actuator and the second actuator.

11. An aerosol-generating system, comprising:
    an aerosol-generating device according to claim 1;
    the first liquid reservoir containing the first liquid aerosol-forming substrate; and
    the second liquid reservoir containing the second liquid aerosol-forming substrate.

12. The aerosol-generating system according to claim 11, wherein the first liquid aerosol-forming substrate comprises water in an amount of at least 40 percent by weight of the first liquid aerosol-forming substrate.

13. The aerosol-generating system according to claim 12, wherein the first liquid aerosol-forming substrate further comprises at least one of propylene glycol, glycerin, nicotine, and a flavourant.

14. The aerosol-generating system according to claim 11, wherein the second liquid aerosol-forming substrate comprises water in an amount of less than 40 percent by weight of the second liquid aerosol-forming substrate.

15. The aerosol-generating system according to claim 14, wherein the second liquid aerosol-forming substrate comprises a flavourant and at least one of propylene glycol and glycerin.

* * * * *